United States Patent [19]

Inui et al.

[11] Patent Number: 5,570,336
[45] Date of Patent: Oct. 29, 1996

[54] INFORMATION RECORDING AND REPRODUCING APPARATUS HAVING A SLIDER FORMAL OF SINGLE CRYSTAL SILICON BODY AND CANTILEVER

[75] Inventors: Tetsuya Inui, Nara; Yorishige Ishii, Yamatotakada; Kenji Ohta, Kitakatsuragi-gun; Kazuhiro Kimura, Sakai; Susumu Hirata, Ikoma-gun, all of Japan

[73] Assignee: Sharp Kabushiki Kaisha, Osaka, Japan

[21] Appl. No.: 163,175

[22] Filed: Dec. 7, 1993

[30] Foreign Application Priority Data

Dec. 8, 1992 [JP] Japan .................................. 4-328256

[51] Int. Cl.⁶ ...................................................... G11B 11/08
[52] U.S. Cl. ........................................... 364/126; 250/306
[58] Field of Search ............................ 369/126; 250/306, 250/307

[56] References Cited

U.S. PATENT DOCUMENTS

| | | | |
|---|---|---|---|
| 4,450,489 | 5/1984 | Barry et al. | 358/348 |
| 4,931,887 | 6/1990 | Hegde et al. | 360/75 |
| 4,998,016 | 3/1991 | Nose et al. | 250/306 |
| 5,260,926 | 11/1993 | Kuroda et al. | 369/100 |
| 5,297,130 | 3/1994 | Tagawa et al. | 369/126 |
| 5,354,985 | 10/1994 | Quate | 250/234 |
| 5,386,110 | 1/1995 | Toda | 250/216 |

FOREIGN PATENT DOCUMENTS

| | | |
|---|---|---|
| 0227845A1 | 7/1987 | European Pat. Off. . |
| 0242597A2 | 10/1987 | European Pat. Off. . |
| 0345696A3 | 12/1989 | European Pat. Off. . |
| 0398656A3 | 11/1990 | European Pat. Off. . |
| 0449409A2 | 10/1991 | European Pat. Off. . |
| 0480645A1 | 4/1992 | European Pat. Off. . |
| 57-162136 | 10/1982 | Japan . |
| 4-157644 | 5/1992 | Japan . |
| 4-206536 | 7/1992 | Japan . |
| WO89/07256 | 8/1989 | WIPO . |

OTHER PUBLICATIONS

K. Petersen, "Thin Film Magnetic Heads", *IBM Technical Disclosure Bulletin*, vol. 21, No. 12, p. 5002, May 1979.
K. Kajimura, "Tunneling Microscope With Various Applications" Jul. 1991 (Nikkei Microdevices) pp. 89–110 (Partial Translation).
Patent Abstracts of Japan, vol. 7, No. 2 (p–166) (1147), Jan. 7, 1983.
McCord et al., "Lithography with the Scanning Tunneling Microscope", J. Vac. Sci. Technol. B4(1), Jan./Feb. 1986, pp. 86–88.
Van Loenen et al., "Direct Writing in Si with a Scanning Tunneling Microscope", Appl. Phys. Lett. 55(13), 25 Sep. 1989, pp. 1312–1314.
Quate, "Imaging with the Tunneling & Force Microscopes", IEEE Micro Electro Mechanical Systems, 11–14 Feb. 1990, pp. 188–191.

*Primary Examiner*—David C. Nelms
*Assistant Examiner*—Andrew Q. Tran
*Attorney, Agent, or Firm*—David G. Conlin; Kevin J. Fournier; William J. Daley, Jr.

[57] ABSTRACT

An information recording and reproducing apparatus of the present invention, in which a tunnel current is utilized for recording information to a recording surface of a recording medium and/or for reproducing information from the recording surface, includes a slider which is arranged on the recording surface and floats above the recording surface by an air flow caused by movement of the recording medium. The slider includes a body having a first surface positioned opposite to the recording surface, a second surface parallel to the first surface, and a third surface oblique to the first and second surfaces. The slider further includes a cantilever having a projecting portion projecting from the body so as to be substantially parallel to the recording surface and a tip for detecting the tunnel current formed on a surface of the projecting portion on the side of the recording surface.

16 Claims, 2 Drawing Sheets

INFORMATION RECORDING AND REPRODUCING APPARATUS HAVING A SLIDER FORMAL OF SINGLE CRYSTAL SILICON BODY AND CANTILEVER

BACKGROUND OF THE INVENTION

1. Field of the Invention

The present invention relates to an information recording and reproducing apparatus in which a fine recording pit is formed on a surface of a disk, utilizing a tunnel current generated between an edge of a tip and the surface of the disk. In addition, the invention relates to an information recording and reproducing slider to be used for such an apparatus, and also relates to a method for manufacturing the slider.

2. Description of the Related Art

Conventionally, an STM (Scanning Tunneling Microscope) has been known as an apparatus for observing the surface of an object on an atomic scale. According to the STM, concavities and convexities of the surface of the object can be measured by bringing a fine probe extremely close to the surface of the object, and then detecting a tunnel current which is generated between the fine probe and the surface of the object.

Such an STM has conventionally been used not only as a means for observing the surface of the object, but also as a means for operating atoms and/or molecules on the surface of the object. By using a finely moving function of the STM and supplying a strong electric field via the probe, the atoms and/or molecules on the surface of the object can be removed or fixed. As a result, a desired structure can be constructed on an atomic scale. Recently, there has arisen an attempt to record information by forming concavities and convexities on a surface of a substrate (disk) on an atomic scale, using the STM.

As shown in FIG. 4, the STM generally includes a cylindrical actuator 4, and a tip (probe) 5 arranged on an edge portion of the actuator 4. On the outer surface of the actuator 4, piezoelectric elements 1, 2, and 3 are arranged. When the tip 5 is brought close to the substrate surface, a tunnel current is generated corresponding to a concavity or convexity on the surface to which the tip 5 is brought close. Therefore, by detecting the tunnel current, the concavity or convexity can be measured. In addition, a crater-shaped fine pit can be formed on the substrate surface by applying a strong current to the tip 5 of the STM. This crater-shaped fine pit can be used as a recording pit to record information to the substrate. There has been proposed another method to record information to the substrate by changing a magnetic property or a dielectric constant of a substrate material. These methods have been described in detail in "NIKKEI MICRODEVICES", July, 1991, p. 89.

As above mentioned, the recording pit can be formed on the disk surface on an atomic scale so as to record and reproduce the information, using the STM. However, an information recording and reproducing apparatus using such an STM is disadvantageously enlarged in size, and the cost of the apparatus becomes expensive. Since the conventional STM shown in FIG. 4 uses a bulk type of piezoelectric element as a driving element thereof, the resulting apparatus is inevitably enlarged in size and the cost thereof becomes expensive.

To overcome the above discussed problems, there has been proposed an information recording and reproducing apparatus utilizing the principles of the STM, such as described in Japanese Laid-Open Patent Publication Nos. 4-157644 and 4-206536. In such an information recording and reproducing apparatus, a structure in which a plurality of tips are arranged is attached to a piezoelectric element, and the plurality of tips are subsequently supplied with a voltage from the piezoelectric element, thereby recording information to the disk and reproducing the information from the disk.

Such an information recording and reproducing apparatus can be made small-sized, but has a disadvantage that the tips and the piezoelectric element for applying a voltage to the tips become complicated in structure. In addition, a mechanism for positioning the tips at a desired track on the disk inevitably becomes complicated.

In all of the above discussed conventional apparatus, the scanning speed of the tip is determined by the driving speed of the piezoelectric element, which limits the improvement of the scanning speed. Therefore, even if the STM is used in order to remarkably increase the recording density of the disk, the resulting apparatus still has problems in that the signal cannot be transmitted to the disk at a higher speed and the recording density of the disk cannot be improved sufficiently.

SUMMARY OF THE INVENTION

An information recording and reproducing apparatus of this invention, in which a tunnel current is utilized for recording information to a recording surface of a recording medium and/or for reproducing information from the recording surface, the apparatus including a slider which is arranged on the recording surface and floats above the recording surface by an air flow caused by movement of the recording medium, the slider includes:

a body having a first surface positioned opposite to the recording surface, a second surface parallel to the first surface, and a third surface oblique to the first and second surfaces, a cantilever having a projecting portion projecting from the body so as to be substantially parallel to the recording surface, and a tip for detecting the tunnel current, formed on a surface Of the projecting portion on the side of the recording surface.

In one embodiment of the invention, the cantilever of the slider includes:

a first electrode layer connected to the tip, an insulating layer formed on the first electrode layer, a second electrode layer formed on the insulating layer, a piezoelectric layer formed on the second electrode layer, and a third electrode layer formed on the piezoelectric layer.

In another embodiment of the invention, the body of the slider includes single crystal silicon which is adjacent to the first electrode layer at the third surface.

In another embodiment of the invention, the body of the slider includes silicon oxide films formed at the first surface and at the second surface.

In another embodiment of the invention, the apparatus further includes a motor for rotating the recording medium in a plane parallel to the recording surface.

In another embodiment of the invention, the apparatus further includes a movement control means for moving the slider in the plane parallel to the recording surface.

In another embodiment of the invention, the movement control means includes a first actuator for moving the slider precisely along a radial direction of the recording medium, and a second actuator for rough moving the slider along the radial direction of the recording medium.

In another embodiment of the invention, the first actuator controls the movement of the slider along the radial direction of the recording medium allowing an accuracy error of 1 µm or less, and the second actuator controls the movement of the slider in the radius direction of the recording medium allowing an accuracy error of 1 µm or more.

A method for manufacturing a slider to be used for an information recording and reproducing apparatus of this invention in which a tunnel current is utilized for recording information to a recording surface of a recording medium and/or for reproducing information from the recording surface, the slider being arranged on the recording surface and floating above the recording surface by means of an air flow caused by movement of the recording medium, includes the steps of:

forming a first silicon oxide film on a top surface of a single crystal silicon substrate, and forming a second silicon oxide film on a bottom surface of the single crystal silicon substrate substantially parallel to the top surface, removing part of the first silicon oxide film, and forming a first opening on the first silicon oxide film, forming a concave portion by an anisotropic etching process from the first opening toward the single crystal silicon substrate so as to form a first surface and a second surface both oblique to the top surface and a third surface parallel to the top surface in the single crystal silicon, forming a first electrode layer, and insulating layer, a second electrode layer, a piezoelectric layer, and a third electrode layer in this order on the top surface, the first surface, the second surface, and the third surface, removing the first electrode layer, the insulating layer, the second electrode layer, the piezoelectric layer, and the third electrode layer formed on the second surface, removing part of the second silicon oxide film, and forming a second opening on the second silicon oxide film, forming a recessed portion so as to reach the first electrode layer formed on the third surface through the second opening, and forming a tip in the recessed portion on the first electrode layer formed on the third surface.

In one embodiment of the invention, at the step for forming the concave portion, the anisotropic etching process is performed using an etchant containing KOH.

In another embodiment of the invention, at the step for forming the tip, the tip is formed by a depositing method using a material selected from a group consisting of W, Pt, Au, and polycrystalline silicon.

In another embodiment of the invention, the second opening has a round shape having a diameter of 0.5 to 5 µm.

In another embodiment of the invention, the method further includes a step for polishing the tip using electrolytic polishing method.

In another embodiment of the invention, the method further includes a step for forming a first hole on the top surface of the single crystal substrate so as to reach the second electrode layer from the third electrode layer.

In another embodiment of the invention, the method further includes a step for forming a second hole on the top surface of the single crystal substrate so as to reach the first electrode layer from the third electrode layer.

According to the information recording and reproducing apparatus of the present invention, the slider is arranged on a disk so as to position the tip at a desired track spot. Next, when the disk is rotated by a rotating mechanism, the slider floats above the disk by aerodynamic effects, maintaining the space between the tip and the disk stable. At this time, a voltage to be applied to the piezoelectric layer is controlled so as to control the location of the tip. Under such conditions, a current is applied to the tip via the STM signal electrode layer, and then a crater-shaped fine pit can be formed on the recording surface of the disk on an atomic scale, thereby recording information to the disk.

On the other hand, when the tip is positioned at the desired track spot and is brought close to the recording surface of the disk on which the crater-shaped fine pit is formed, a tunnel current is generated. This tunnel current corresponds to a concavity or convexity of the recording surface. Thus, the information recorded on the disk is reproduced by a detecting section which detects the tunnel current via the tip and the STM signal electrode layer.

According to the information recording and reproducing apparatus of the present invention where the information is recorded and reproduced utilizing STM principles, the signal can be recorded on the substrate at extremely high density, and a linear velocity of the recording performance can remarkably be improved, thereby increasing the transmission rate of the signal. In addition, the slider can stably float above the recording surface by the aerodynamic effects, so that the fluctuation in the space between the tip and the substrate surface can be decreased even when the tip scans the disk at a high speed. In addition, the recording and reproducing mechanism can be made compact and simple, and the production cost thereof can remarkably be reduced.

The information recording and reproducing apparatus of the present invention can be made compact and simple, and the mass production thereof can be realized at a low cost. In addition, the slider can be produced utilizing semiconductor manufacturing techniques, so that the slider can be manufactured in a large scale at a remarkably low cost.

Thus, the invention described herein makes possible the advantages of (1) providing an information recording and reproducing apparatus in which a signal can be transmitted to a recording medium at a sufficiently high speed, and information can be recorded to the recording medium at high density, the apparatus having a simple structure to allow mass production thereof at a low cost; and (2) providing an information recording and reproducing slider suitable for such an information recording and reproducing apparatus, the slider having a simple structure to allow mass production thereof at a remarkably low cost.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating an example with reference to the drawings.

In an exemplary information recording and reproducing apparatus of the present invention, a tunnel current is utilized for recording information to a recording surface of a recording medium and/or reproducing thus recorded information. The apparatus includes a slider which is arranged on the recording surface of the recording medium. The slider leaves the recording surface and stably floats above the recording surface by means of an air flow in accordance with the movement of the recording medium.

Figure 1:
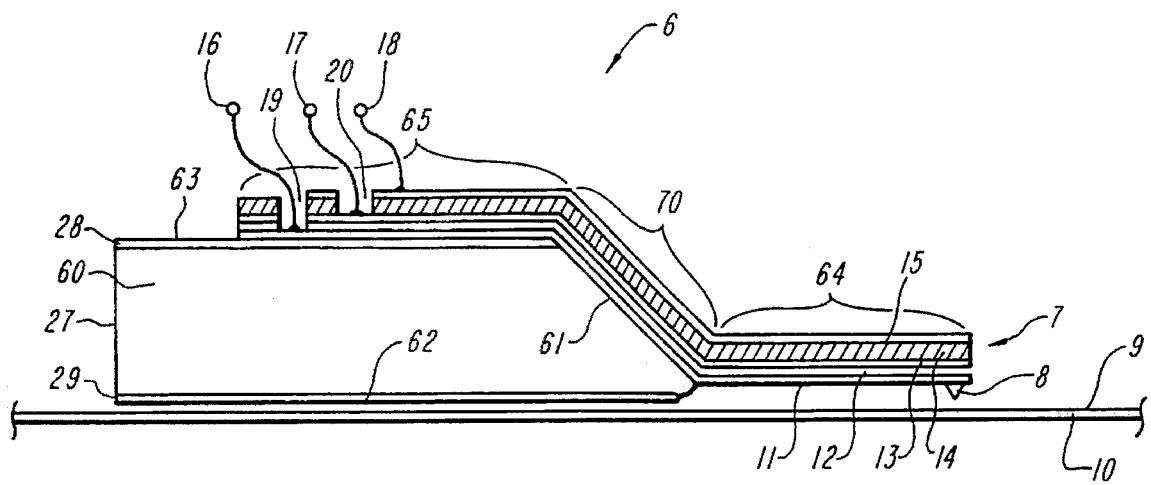
FIG. 1 shows a cross-sectional view of a slider according to an example of the present invention.

Hereinafter, such a slider will be described referring to FIG. 1. FIG. 1 shows a cross-sectional view of the slider 6 to be used for the information recording and reproducing apparatus of the present invention. A body 60 of the slider 6 includes a first surface 62 positioned opposite to the recording surface 9 of the recording medium 10, a second surface 63 parallel to the first surface 62, and a third surface 61 oblique to the first surface 62. The body 60 further includes a single crystal silicon layer 27, and silicon oxide films 29 and 28 formed at the first surface 62 and the second surface 63, respectively. The slider 6 further includes a cantilever 7 having a projecting portion 64 protruding from the body 60 so as to be substantially parallel to the recording surface 9, a central portion 70 adjacent to the third surface 61, and a horizontal portion 65 adjacent to the second surface 63. A tip (probe) 8 for detecting a tunnel current is formed on a surface of the projecting portion 64 on the side of the recording surface 9 of the recording medium 10. The tip 8 is made of tungsten (W). The tip 8 can also be made of platinum (Pt), gold (Au), polycrystalline silicon, or the like. The projecting portion 64, the central portion 70, and the horizontal portion 65 of the cantilever 7 are formed so as to have the substantially same thickness.

For information recording and reproducing performance, the slider 6 is arranged on the recording surface 9 of the recording medium 10 so that an STM signal can be recorded to and reproduced from the recording medium 10 via the tip 8.

In the cantilever 7, an STM signal electrode layer 11, an insulating layer 12, a piezoelectric electrode layer 13, a piezoelectric layer 14, and a piezoelectric electrode layer 15 are formed in this order from the side of the recording medium 10. Two connecting holes 19 and 20 are formed on the horizontal portion 65 of the cantilever 7. The connecting hole 19 is formed around an edge portion of the horizontal portion 65 on the other side of the central portion 70, while the connecting hole 20 is formed between the connecting hole 19 and the central portion 70. Through the connecting hole 19, a signal line 16 is connected to the STM signal electrode layer 11. That is, the connecting hole 19 has a depth to reach the STM signal electrode layer 11, and thus an edge of the signal line 16 is connected to the surface of the STM signal electrode layer 11.

On the other hand, through the connecting hole 20, a signal line 17 is connected to the piezoelectric electrode layer 13. That is, the connecting hole 20 has a depth to reach the piezoelectric electrode layer 13, and thus an edge of the signal line 17 is connected to the surface of the piezoelectric electrode layer 13. An edge portion of the uppermost located piezoelectric electrode layer 15 of the horizontal portion 65 on the other side of the central portion 70 is situated a little closer to the central portion 70 than those of the other layers are. In addition, the uppermost located piezoelectric electrode layer 15 is connected to a signal line 18 near the connecting hole 20 on the other side of the connecting hole 19. According to the above structure, the STM signal electrode layer 11, the piezoelectric electrode layer 13, and the uppermost located piezoelectric electrode layer 15 can independently be connected to the signal lines 16, 17, and 18, respectively.

Such an STM signal electrode layer 11 functions as means for introducing the STM signal (STM current) into a control section (not shown), and is made of a metal such as Al, Ni, Au, Ta, or Mo, or an alloy thereof. The insulating layer 12 functions as means for electrically insulating the STM signal electrode layer 11 from the piezoelectric electrode layer 13, and is made of SiO, $SiO_2$, AlN, SiN, polysilicon, or the like.

The piezoelectric electrode layers 13 and 15 both function as means for supplying a voltage to drive the piezoelectric layer 14, and are each made of a metal such as Al, Ni, Au, Ta, or Mo, or an alloy thereof. The piezoelectric layer 14 is made of a piezoelectric material functioning as a bimorph, such as PZT, PLZT, ZnO, AlN, or $TiBaO_3$. The piezoelectric layer 14 made of such a piezoelectric material can be transformed in a direction vertical to an elongated direction of the projecting portion 64 by a voltage applied between the piezoelectric electrode layers 13 and 15 located on and under the piezoelectric layer 14. Accordingly, the tip 8 is moved toward the recording surface 9 of the recording medium 10, and the distance between the tip 8 and the recording surface 9 is controlled. The slider 6 having such a structure can be manufactured according to a production process described below.

As the recording medium 10, a metal thin film, a semiconductor thin film, an amorphous thin film, a magnetic thin film, or the like may be employed. In the present example, the recording medium 10 may be formed on a substrate made of Al, an alloy of Al, glass, ceramic, or the like.

To record the STM signal using a fine recording pit, the recording surface 9 of the recording medium 10 is required to be extremely smooth. An EEM (Elastic Emission Machining) method can be utilized to make the surface of the recording surface 9 extremely smooth, in which a rotating polyurethane ball is pressed onto the recording surface 9 in an aqueous solution containing abrasives so that the liquid and the abrasives can flow between the polyurethane ball and the recording surface 9, thereby polishing the recording surface 9 by means of the flow of the abrasives. This EEM method enables the processed surface (polished surface) to have surface roughness of about several nm or less. According to the present invention, the surface roughness of the recording medium 10 is preferably 10 nm or less, more preferably 1 nm or less.

Next, a method for manufacturing the slider 6 will be described referring to FIGS. 2A to 2F.

Figure 2A:
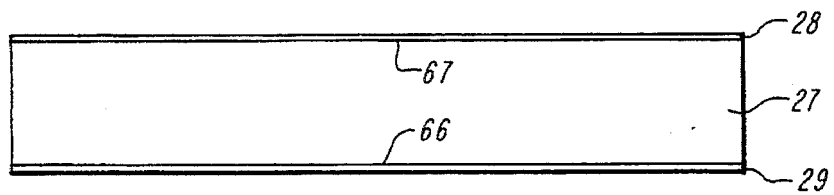
FIGS. 2A to 2F show a production process for producing the slider of FIG. 1.

First, as shown in FIG. 2A, silicon oxide films ($SiO_2$ films) 28 and 29 are formed on a top surface 67 and a bottom surface 66 of a single crystal silicon substrate 27, respectively. The top surface 67 and the bottom surface 66 are substantially parallel to each other.

Figure 2B:
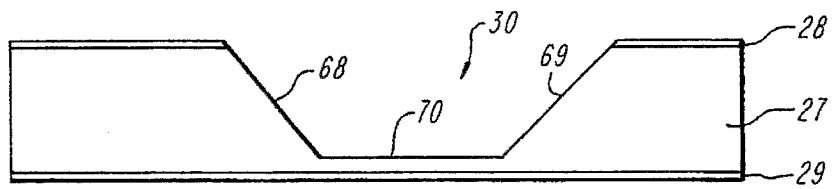

Next, a resist film is formed on the silicon oxide film 28, and then a prescribed portion of the resist film is removed to form an opening region in the resist film. Subsequently, an exposed portion of the silicon oxide film 28 is removed by a dry etching method, and then the resist film is removed. The exposed portion of the silicon oxide film 28 can be removed by an ion milling method, or the like. Next, an exposed portion of the single crystal silicon is anisotropically etched using an etchant which contains KOH, so that a concave portion 30 is formed at the central portion of the top surface 67 of the single crystal silicon substrate 27, as shown in FIG. 2B. The concave portion 30 has a first surface 68 and a second surface 69 both oblique to the top surface 67 of the single crystal silicon substrate 27, and a third surface 70 substantially parallel to the top surface 67.

Figure 2C:
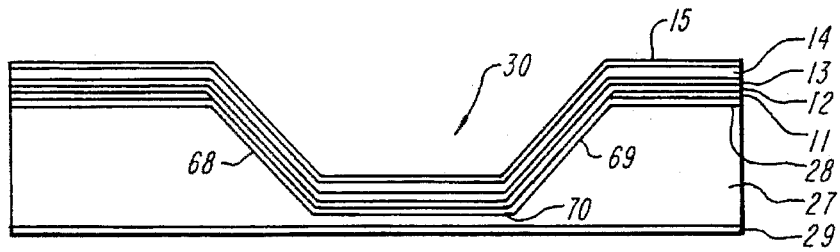

Next, as shown in FIG. 2C, the STM signal electrode layer 11, the insulating film 12, the piezoelectric electrode layer 13, the piezoelectric layer 14, and the piezoelectric electrode layer 15 are formed in this order on the first surface 68, the second surface 69, and the third surface 70 of the concave portion 30 and on the silicon oxide film 28 by a depositing method. These layers and the film can also be formed by a sputtering method, a CVD method, or the like. These layers and the film can be formed using the materials described above respectively.

Figure 2D:
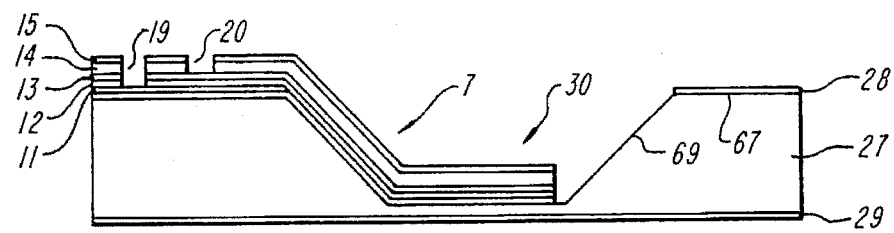

Next, as shown in FIG. 2D, portions of the STM signal electrode layer 11, the insulating film 12, the piezoelectric electrode layer 13, the piezoelectric layer 14, and piezoelectric electrode layer 15 formed on the second surface 69 and on the top surface 67 adjacent to the second surface 69 are removed by photolithography. The connecting holes 19 and 20 described above are also formed by photolithography.

Figure 2E:
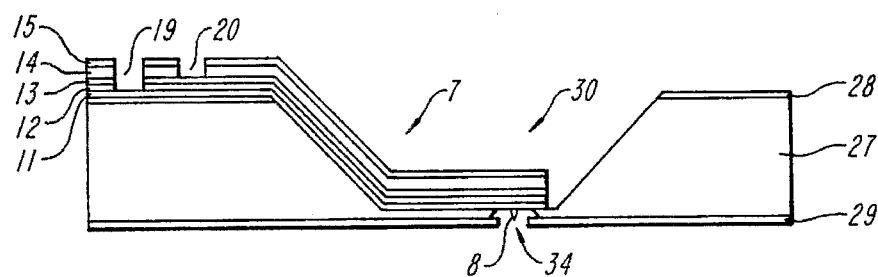

Next, as shown in FIG. 2E, an opening 34 is formed in the silicon oxide film 29 by photolithography. The opening 34 of the silicon oxide film 29 is positioned around an edge portion of the cantilever 7 on the side of the second surface 69. Subsequently, a photoresist is formed to cover an upper surface of a substrate in which the cantilever 7 is formed on the single crystal silicon substrate 27. Then the single crystal silicon substrate 27 is anisotropically etched using an etchant including KOH, and thereby a opening in the single crystal silicon substrate 27 corresponding to the opening 34 of the silicon oxide film 29 is formed. A portion of the bottom surface of the cantilever 7, i.e., the undermost located STM signal electrode layer 11 is exposed in the opening of the single crystal silicon substrate 27. The opening 34 has a round shape having a diameter of 0.5 to 5 µm, preferably.

Thereafter, the tip 8 is formed on the STM signal electrode layer 11 by depositing W through the opening 34 of the silicon oxide film 29 so as to be sharpened toward the opening 34. The tip 8 can also be formed by depositing Pt, Au, polycrystalline silicon, or the like. The tip 8 can be formed to have a cone shape by regulating the shape of the opening 34 of the silicon oxide film 29. After forming the tip 8, the tip 8 can be sharpened by means of an electrolytic polishing process. The height of the tip 8 is preferably 0.5 to 5 µm, and the bottom of the tip 8 has a round shape having a diameter of 0.5 to 5 µm, preferably. The tip 8 can also be formed to have a quadrangular pyramid shape or the like.

Figure 2F:
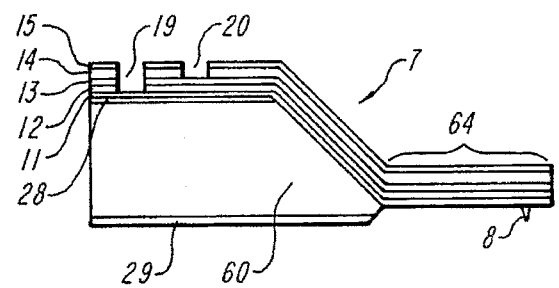

Next, as shown in FIG. 2F, the unnecessary portion of the single crystal silicon substrate 27 and the silicon oxide films 28 and 29 are removed by etching to form the slider 6. Thus, the slider 6 shown in FIG. 1 in which the cantilever 7 is integrally formed on the top surface and the oblique surface of the body 60 is obtained.

Finally, by wire-bonding techniques, the signal line 16 is connected to the STM signal electrode layer 11 through the connecting hole 19, the signal line 17 is connected to the piezoelectric electrode layer 13 through the connecting hole 20, and the uppermost located piezoelectric electrode layer 15 is connected to the signal line 18 near the connecting hole 20 on the other side of the connecting hole 19, as shown in FIG. 1.

Figure 3:
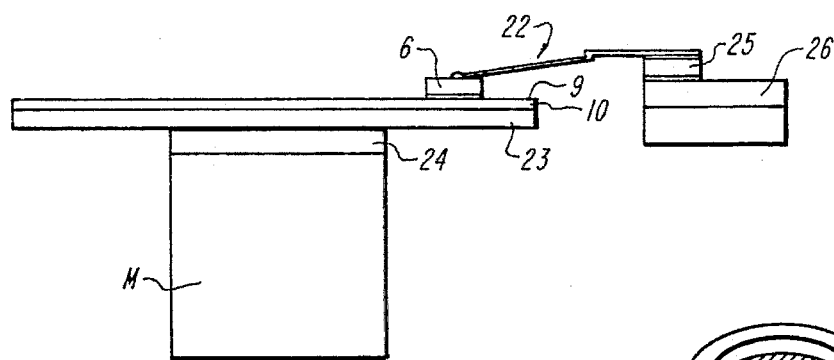
FIG. 3 shows a cross-sectional view of an information recording and reproducing apparatus using the slider of FIG. 1 according to an example of the present invention.
Figure 4:
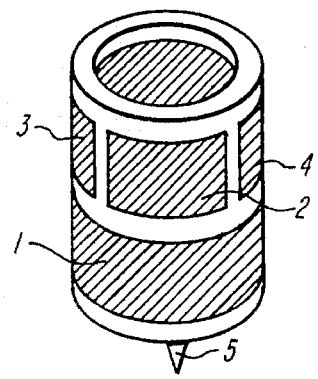
FIG. 4 is a perspective view of an exemplary conventional STM.

Hereinafter, a structure for an information recording and reproducing apparatus using the slider 6 will be described referring to FIG. 3.

The slider 6 is arranged on the recording surface 9 of the recording medium 10 formed on a circular disk 23. The central portion of the top surface of the slider 6 is connected to an edge portion of a support spring 22 for pressing the slider 6 onto the disk 23. The other end portion of the support spring 22 is connected to a piezoelectric actuator 25 which is connected to a linear driving actuator 26. The slider 6 is driven along a radial direction of the disk 23 by the piezoelectric actuator 25 and the linear driving actuator 26. With such a structure, the tip 8 can be positioned at a desired recording track of the disk 23.

The piezoelectric actuator 25 has a precisely moving mechanism to position the slider 6 at the desired recording track allowing an accuracy error (a margin of error) of 1 µm or less. On the other hand, the linear driving actuator 26 has a coarsely (rough) moving mechanism to move the slider 6 at a high speed but allowing an accuracy error of 1 µm or more. Therefore, the slider 6 can be moved by the linear driving actuator 26 at a high speed, and then it is moved by the piezoelectric actuator 25 with high accuracy. Thus, the tip 8 can be positioned at the desired recording track of the disk 23 at a high speed and with high accuracy. The disk 23 is mounted on a spindle 24 connected to a motor M, and is rotated around the center of the disk 23. An air bearing with high rotating accuracy is preferably used as a bearing for the spindle 24 so that the disk 23 can be rotated stably.

When the disk 23 is rotated, the slider resists the force of the support spring 22 for pressing the slider 6 onto the disk 23, and finally floats above the disk 23 by aerodynamic effects caused by the rotation of the disk 23. Then, the slider 6 becomes stable maintaining the space from the disk 23 at 0.1 to several µm. Accordingly, the space between the tip 8 and the recording medium 10 of the disk 23 becomes stable.

Next, it will be described how information is recorded to the recording medium 10 of the disk 23 and how the information is reproduced according to the present example. First, the slider 6 is moved along the radial direction of the disk 23 by both of the actuators 25 and 26 so as to be positioned at a desired recording track of the disk 23. Next, the piezoelectric electrode layers 13 and 15 are supplied with a voltage from a voltage supplying means (not shown) via the signal lines 17 and 18. At this time, the voltage values to be applied to the piezoelectric electrode layers 13 and 15 are controlled by a feedback circuit (not shown) so as to maintain an STM current to be detected via the signal line 16 stable. The feedback circuit is preferably provided with a low-pass filter. The reason is that the use of the low-pass filter prevents a frequency signal for recording and reproducing the STM signal from being processed as noise by a control voltage of the cantilever 7, which makes the control operation more accurate.

For recording information to the disk 23, a large amount of current is applied to the tip 8 by a power source circuit (not shown) so as to generate discharge between the tip 8 and the surface of the disk 23. The thus generated discharge forms a crater-shaped fine pit on the recording surface 9 of the recording medium 10 of the disk 23, thereby recording information to the disk 23.

On the other hand, for reproducing the information thus recorded to the disk 23, the tip 8 is positioned at the desired recording track by the actuators 25 and 26 as above described, and then the space between the tip 8 and the recording surface 9 is controlled. At this time, the tip 8 detects a tunneling current which is generated due to the presence of the crater-shaped fine pit formed on the recording surface 9. The tunnel current is transmitted to a signal detecting section (not shown) via the STM signal electrode layer 11 and the signal line 16, and is subject to a signal processing step, thereby reproducing the information.

According to the information recording and reproducing apparatus using such a slider 6 where the tip 8 is driven and controlled by the piezoelectric element and the actuators 25 and 26, the information recording speed can be made much higher compared with prior art where a conventional slider is driven only by a piezoelectric element.

The slider 6 can stably be floated above the disk 23 by aerodynamic effects. Therefore, even when the tip 8 scans the surface of the disk 23 at a high speed, the fluctuation in the space between the tip 8 and the disk 23 can be decreased, and consequently the location of the tip 8 can be controlled with high accuracy. Therefore, the recording and reproducing apparatus can be made compact and simple without necessitating additional means for controlling the location of the tip 8.

Furthermore, according to the present example, the information recording and reproducing speed is greatly improved, so that the number of tips required for the information recording and reproducing performance can be reduced to one. Therefore, the recording and reproducing apparatus can further be made compact and simple without necessitating a complicated positioning mechanism.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording and reproducing apparatus in which a tunnel current is utilized for recording information to a recording surface of a recording medium and/or for reproducing information from said recording surface, said apparatus comprising a slider which is arranged on said recording surface and floats above said recording surface by an air flow caused by movement of said recording medium, said slider including:

a body having a first surface positioned opposite to said recording surface, a second surface parallel to said first surface, and a third surface oblique to said first and second surfaces, a cantilever having a projecting portion projecting from said body so as to be substantially parallel to said recording surface, and a tip for detecting said tunnel current, formed on a surface of said projecting portion on the side of said recording surface;

wherein said cantilever of said slider includes a first electrode layer connected to said tip, an insulating layer formed on said first electrode layer, a second electrode layer formed on said insulating layer, a piezoelectric layer formed on said second electrode layer, and a third electrode layer formed on said piezoelectric layer.

2. An apparatus according to claim 1, wherein said body of said slider includes single crystal silicon which is adjacent to said first electrode layer at said third surface.

3. An apparatus according to claim 2, wherein said body of said slider includes silicon oxide films formed at said first surface and at said second surface.

4. An apparatus according to claim 1, further comprising a motor for rotating said recording medium in a plane parallel to said recording surface.

5. An apparatus according to claim 4, further comprising a movement control means for moving said slider in said plane parallel to said recording surface.

6. An apparatus according to claim 5, wherein said movement control means includes a first actuator for moving said slider precisely along a radial direction of said recording medium, and a second actuator for moving said slider roughly along the radial direction of said recording medium.

7. An apparatus according to claim 6, wherein said first actuator controls the movement of said slider along the radial direction of said recording medium allowing an accuracy error of 1 µm or less, and said second actuator controls the movement of said slider along the radial direction of said recording medium allowing an accuracy error of 1 µm or more.

8. An information recording and reproducing apparatus utilizing a tunneling current for recording information to a recording surface of a recording medium and/or reproducing information from said recording surface, said apparatus comprising:

a slider which is arranged on said recording surface and floats above said recording surface by an air flow and including a body, said body having:

a first surface positioned as being opposed to said recording surface;

a second surface being parallel to said first surface; and a third surface being oblique to said first and second surfaces;

a cantilever being projected from said slider and including:

a first electrode layer connected to a tip;

an insulating layer formed on said first electrode layer;

a second electrode layer formed on said insulating layer;

a piezoelectric layer formed on said second electrode layer; and a third electrode layer formed on said piezoelectric layer; and said tip for detecting said tunneling current, said tip being formed on said cantilever.

9. An apparatus according to claim 8, wherein said air flow is caused by movement of said recording medium.

10. An apparatus according to claim 8, wherein said cantilever comprises:

a horizontal portion adjacent to said second surface of said body of said slider;

a central portion adjacent to said third surface of said body of said slider; and a projecting portion protruding from said slider to be substantially parallel to said recording surface, wherein said tip is formed on a surface of said projecting portion.

11. An apparatus according to claim 8, wherein said body of said slider further includes single crystal silicon which is adjacent to said first electrode layer at said third surface.

12. An apparatus according to claim 11, wherein said body of said slider further includes silicon oxide films formed at said first surface and at said second surface.

13. An apparatus according to claim 8, further comprising a motor for rotating said recording medium in a plane parallel to said recording surface.

14. An apparatus according to claim 13, further comprising a movement control means for moving said slider in said plane parallel to said recording surface.

15. An apparatus according to claim 14, wherein said movement control means includes:
   a first actuator for moving said slider precisely along a radial direction of said recording medium; and
   a second actuator for moving said slider roughly along the radial direction of said recording medium.

16. An apparatus according to claim 15, wherein said first actuator controls the movement of said slider along the radial direction of said recording medium allowing an accuracy error of 1 µm or less, and said second actuator controls the movement of said slider along the radial direction of said recording medium allowing an accuracy error of 1 µm or more.

* * * * *